United States Patent [19]
Timmermeyer et al.

[11] 3,943,414
[45] Mar. 9, 1976

[54] ELECTRONIC SYSTEM PALLET HAVING A GIRDERED FALSE DECK

[75] Inventors: Leo C. Timmermeyer, Mobile, Ala.; Samuel Davis, Woodland Hills; William J. Knight, Pacific Palisades, both of Calif.

[73] Assignee: Litton Systems, Inc., Beverly Hills, Calif.

[22] Filed: July 29, 1974

[21] Appl. No.: 492,601

[52] U.S. Cl. .................. 317/122; 52/220; 317/99; 174/72 A
[51] Int. Cl.² .......................................... H02B 1/20
[58] Field of Search ........ 317/99, 101 CB, 101 CE, 317/117, 122; 174/48, 49, 72 A; 307/147; 52/126, 220, 221, 262

[56] References Cited
UNITED STATES PATENTS

| | | | |
|---|---|---|---|
| 2,363,327 | 11/1944 | Hodgkins et al. | 317/122 |
| 2,940,016 | 6/1960 | Flint et al. | 317/99 |
| 3,303,264 | 2/1967 | Saul et al. | 174/48 |
| 3,623,936 | 11/1971 | Hotz | 174/72 A |
| 3,643,389 | 2/1972 | Shippley, Jr. | 52/220 |
| 3,657,608 | 4/1972 | Leone | 317/101 CB |

Primary Examiner—Gerald P. Tolin

[57] ABSTRACT

An electronic system pallet having a girdered false deck for the installation of a plurality of electronic units or consoles thereon to form one or more electronic systems. The units or consoles are cabled together through the girdered false deck, and are connected to one or more connector junctions in the pallet edge.

8 Claims, 1 Drawing Figure

U.S. Patent  March 9, 1976  3,943,414
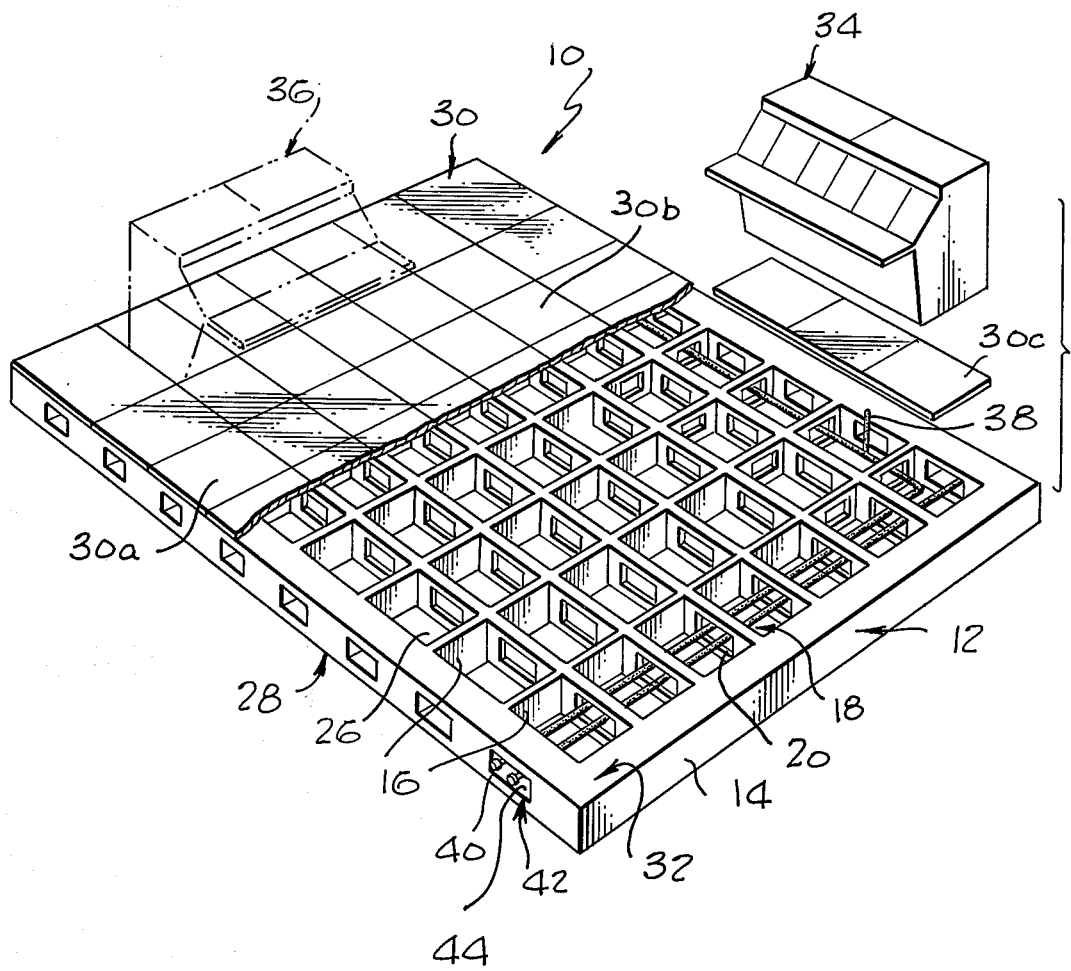

3,943,414

ELECTRONIC SYSTEM PALLET HAVING A GIRDERED FALSE DECK

BACKGROUND OF THE INVENTION

Ships constructed from a plurality of modules (see U.S. Pat. No. 3,447,505, granted June 3, 1969, and assigned to the same assignee as the present invention) are being delivered for fitting to the specific requirement of a user. In military applications, these ships frequently require extensive electronic systems. These electronic systems are placed in the ship as one or more electronic suites. The complexity of these systems, which require periodic check-out, maintenance, and overhaul and repair, and the efficient utilization of space within each ship present a continuing problem not only to the ship designers but also the out-fitters.

OBJECTS OF THE INVENTION

Accordingly, it is an object of the invention to provide a new and improved electronic system pallet.

It is an object of the invention to provide an electronic system pallet that enhances installation, replacement, and check out of the electronic system.

SUMMARY OF THE INVENTION

Briefly, in accordance with the invention, a new and improved electronic system pallet is provided having a support panel formed by a plurality of apertured girders positioned in an internal grid and by a plurality of removable support panels positioned on the grid, and having at least one electronic unit or console positioned on the support panel and electrically interconnected through the apertured girders to a connector junction at a selected portion of an outer edge of the panel so that the pallet is self-contained and readily connectable to external electrical connectors.

While the specification concludes with claims particularly pointing out and distinctly claiming the subject matter which may be regarded as the invention, the organization and method of operation, together with further objects, features, and the attending advantages thereof, may best be understood when the following description is read in connection with the accompanying drawing.

BRIEF DESCRIPTION OF THE DRAWING

The sole FIGURE is a perspective view, partly exploded and partly broken away, of the electronic system pallet of the invention.

DESCRIPTION OF THE INVENTION

Referring to the sole FIGURE, an electronic system pallet 10 formed in accordance with the invention has a support panel 12 that can be rectangular as illustrated although it is contemplated that the panel can be of any selected geometric configuration. An outer edge portion 14 of the support panel 12 provides a rigid frame for a plurality of similar girders 16 arranged in a grid pattern as illustrated. Again, it is contemplated that the grid pattern can be other than the rectangular grid pattern formed by the similar rectangular cells 18 as illustrated, and can be formed from plural-sided cells other than the four-sided cells 18. Selected girders 16 have suitably formed and preferably similar apertures 20 that open adjacent cells 18 to each other.

The electronic system pallet 10 has a panel 26 covering the reverse surface 28 of the support panel 12 although it is contemplated that the reverse panel 26 could be omitted in part or in total. A plurality of removable panels 30, such as 30a, 30b, 30c cover the obverse surface 32 of the support panel 12. The removable panels 30 can be either positioned under or positioned around one or more electronic units or consoles, such as electronic console 34 and electronic console 36 which is illustrated in an exploded and phantom relationship to the support panel 12.

Each electronic console, for example, electronic console 34, is electrically connected by a cable, here cable 38 for electronic console 34, that passes through the selected apertures 20 in the girder members 16 and related cells 18 between the obverse and reverse surfaces 32 and 28, respectively, to a connector junction, here connector junction 40 for cable 38, which is positioned in a selected portion 42 of the panel edge portion 14. Although it is preferred that the connector junctions, such as connector junction 40, be positioned within a recess, such as recess 44 for connector junction 40, it is contemplated that the connector junction can extend outwardly from the edge portion 14 and not be positioned with a recess portion.

Compared to conventional techniques, the electronic system pallet 10 of the invention offers improved advantages in installation and checkout of an electronic system, and in particular, the electronic system of a ship. One or more electronic system pallets 10 may be produced and checked out prior to shipboard installation where subsystem pallets can be electrically interconnected and integrated. One advantage of this is that a number of electronic system pallets 10, each containing many electronic subsystems, can be checked out simultaneously. This capability to allow simultaneous construction, installation, and checkout, reduces the time required to outfit a ship with its electronic systems. It will be apparent that this is true for other pallet installations as well. A further advantage is the ease of maintenance, overhaul and repair, modernization, or conversion to accommodate new electronic systems, and with the electronic system pallet of the invention, new electronic system pallets may be produced to replace existing pallets.

As will be evidenced from the foregoing description, certain aspects of the invention are not limited to the particular details of construction as illustrated, and it is contemplated that other modifications and applications will occur to those skilled in the art. It is, therefore, intended that the appended claims shall cover such modifications and applications that do not depart from the true spirit and scope of the invention.

We claim:

1. An electronic system pallet comprising:
    a. a single piece support panel having an outer periphery developing a frame section and a hollow inner section, and further generally developing an obverse surface and a reverse surface,
    b. a plurality of integral girder members extending between and connected to portions of said outer frame section, selected ones of said girder members having a plurality of apertures,
    c. a plurality of removable panels positioned on said obverse surface,
    d. at least one electronic console positioned on said obverse surface,
    e. at least one cable for said electronic console positioned through selected ones of said apertures from said electronic console to a selected portion of said outer section, and f. a connector junction at said selected portion of said outer section for said cable so that said cable is electrically connected from said console to said connector junction and between said obverse and reverse surfaces.

2. The electronic system pallet of claim 1 in which said electronic console is positioned on at least one of said removable panels.

3. The electronic system pallet of claim 1 in which a panel is positioned on said reverse surface covering said girder members.

4. The electronic system pallet of claim 1 in which said girder members are positioned in a grid having a plurality of cells.

5. The electronic system pallet of claim 4 in which said apertures open adjacent cells to each other.

6. The electronic system pallet of claim 4 in which each of said cells has a plurality of sides developing a geometric shape.

7. The electronic system pallet of claim 6 in which said geometric shape is rectangular.

8. The electronic system pallet of claim 1 in which said connector junction is recessed into said selected portion of said outer section.

* * * * *